United States Patent
Moriarty et al.

(10) Patent No.: US 6,899,595 B2
(45) Date of Patent: May 31, 2005

(54) SEAL ASSEMBLY MANUFACTURING METHODS AND SEAL ASSEMBLIES MANUFACTURED THEREBY

(76) Inventors: Maurice J. Moriarty, 21614 N. 59th La., Glendale, AZ (US) 85308; Matthew V. Hartford, 27220 N. 32nd La., Phoenix, AZ (US) 85085; Joseph D. Moriarty, 21217 N. 52nd Ave., Glendale, AZ (US) 85308

( * ) Notice: Subject to any disclaimer, the term of this patent is extended or adjusted under 35 U.S.C. 154(b) by 0 days.

(21) Appl. No.: 10/402,507

(22) Filed: Mar. 28, 2003

(65) Prior Publication Data

US 2003/0184017 A1 Oct. 2, 2003

Related U.S. Application Data (60) Provisional application No. 60/368,566, filed on Mar. 29, 2002.

(51) Int. Cl.[7] .................................................. B24B 1/00
(52) U.S. Cl. ............................ 451/36; 451/37; 451/51; 451/58; 451/63
(58) Field of Search ............................. 451/37, 36, 51, 451/57, 58, 60, 63, 262, 264, 265, 267, 268, 269, 270, 271; 277/489–492

(56) References Cited

U.S. PATENT DOCUMENTS

| 1,725,660 | A | * | 8/1929 | Madsen | 277/491 |
| 1,861,716 | A | * | 6/1932 | Petre | 277/446 |
| 3,811,690 | A | * | 5/1974 | Moriarty | 277/494 |
| 3,851,889 | A | * | 12/1974 | Nisper | 277/461 |
| 4,040,637 | A | * | 8/1977 | McCormick | 277/460 |
| 5,921,553 | A | * | 7/1999 | Klein | 277/492 |
| 6,322,080 | B1 | * | 11/2001 | Feistel | 277/490 |
| 6,378,872 | B1 | * | 4/2002 | Moriarty | 277/310 |

FOREIGN PATENT DOCUMENTS

JP          9-177442 A  *  8/1997

* cited by examiner

*Primary Examiner*—Timothy V. Eley
(74) *Attorney, Agent, or Firm*—Parsons & Goltry; Michael W. Goltry; Robert A. Parsons (57) ABSTRACT

Finishing a seal assembly as a unit is proposed, which prevents alignment of the end gaps of the annular body and the annular ring of the seal assembly, provides the ability to manufacture the seal assembly to very low tolerances, and establishes virtually perfect parallelism between the upper and lower surfaces of the seal assembly. A finishing process is characterized by lapping a seal assembly as an assembled unit with a lapper using gritted oil as a polishing medium.

2 Claims, 5 Drawing Sheets

SEAL ASSEMBLY MANUFACTURING METHODS AND SEAL ASSEMBLIES MANUFACTURED THEREBY

CROSS-REFERENCE TO RELATED APPLICATIONS

This application claims the benefit of U.S. Provisional Application Ser. No. 60/368,566, filed Mar. 29, 2002.

FIELD OF THE INVENTION

This invention concerns seals and, more particularly, annular seals for minimizing fluid leakage between reciprocally movable members and to methods of manufacturing such annular seals.

BACKGROUND OF THE INVENTION

Various mechanical apparatus include first and second members, which are substantially coaxial and disposed for relative reciprocal movement. Exemplary are internal combustion engines, positive displacement pumps, pneumatic motors and other mechanical devices incorporating a piston and a cylinder assembly. Other examples will occur to the skilled artisan.

Commonly, the cylinder is defined by a bore having a cylindrical sidewall. The piston, a generally cylindrical member, includes a sidewall and a top. An end wall or head, opposing the top of the piston, closes one end of the bore. A chamber of variable capacity is defined within the bore between the head and the top of the piston. Pressurized fluid functions in this chamber. In an internal combustion engines, the fluid is the expanding gas of combustion, which ignites and propels the piston downwardly or away from the head. Pressurized fluid from an external source is introduced into the chamber of a pneumatic motor to force movement of the piston. In a pump, which is companion to the engine and to the pneumatic motor, fluid is compressed and pressurized in the chamber.

To provide for relative movement between the members, the diameter of the piston must be less than the diameter of the bore. Frequently, substantial clearance is required. For example, it is well known that a piston is more sensitive to thermal expansion than is a cylinder. Accordingly, where heat is a factor, such as in internal combustion engine, additional space must be provided between the sidewall of the bore and the sidewall of the piston to accommodate thermal expansion of the piston. The space, commonly referred to as sidewall clearance, is generally in the range of fifteen ten-thousandths of an inch to five one-thousandths of an inch, or greater.

However, the piston must be sealed to the cylinder. Conventionally, this is accomplished by a device commonly referred to as a piston ring, an annular seal usually fabricated of metal such as cast iron. The ring is received within a mating annular ring groove formed into the sidewall of the piston. To facilitate expansion during installation, and for other reasons, the ring is radially severed.

The spacing between the opposed ends of the severed ring, known as the end gap, serves various functions after installation. Having an inherent tendency to expand, the ring maintains tension for attendant sealing against the sidewall of the cylinder as the bore increases in diameter as a result of wear. The end gap also allows for thermal expansion of the ring resulting from heat generated by friction, compression of fluid, combustion of fuel and other sources.

Although necessary and even beneficial, the end gap is also the source of considerable concern. Normal end gap clearance in a newly installed ring ranges from approximately ten one-thousandths of an inch to approximately forty one-thousandths of an inch. The end gap defines a path for leakage of fluids between the sidewall of the piston and the sidewall of the bore. Throughout the life of the device, the piston ring continuously expands as compensation for normal wear. As a result, the end gap ever increases with corresponding increase in leakage, usually referred to as a blow-by.

Efficiency, economy and service life of the apparatus is directly related to blow-by. In general, less than optimum output of the apparatus results from loss of pressure or compression of the fluid. Other deleterious effects are unique to the particular apparatus. In an internal combustion engine, for example, contaminating by-products of combustion suspended in the blow-by gases are carried into the lubricating system, which harms components throughout the engine.

In recognition of the desirability of enhancing the seal between the piston and the cylinder, the prior art has proposed various seals, which purportedly reduce or eliminate blow-by. Several prior art proposals are direct attempts to eliminate the end gap in the conventional piston ring. Various proposals include an insert, which spans the end gap and is received in a notch formed into the ring on either side of the end gap. Other proposals include the use of a relatively thin steel member, alternately named a ribbon member or a gap seal member, having a substantially rectangular cross-section. Also advanced is a plurality of severed annular members, installed in stacked arrangement with staggered end gaps. The prior art has also advocated the use of thin steel members, colloquially dubbed rails, in combination with ring members having a general resemblance to conventional piston rings. Being of substantially heavier construction than a rail and usually fabricated of malleable material, such as cast iron, the ring member is variously referred to as a packing member or a sealing ring. The ring member in combination with the rail member comprise a seal assembly of which various embodiments are known.

In accordance with one known arrangement, the rail resides within an annular groove formed into the inner circular wall of the seal member and exerts outwardly directed radial pressure to hold the seal member in contact with the sidewall of the bore. In another configuration, the rail occupies a space between the top of the seal member and the upper radial surface of the containing ring groove. Still other formations orient the radial axis of the rail at an angle.

For various reasons, annular seals of the foregoing character are not entirely satisfactory. For example, in an assembly wherein the rail resides within the seal member and exerts an expansive force, excessive friction is generated against the sidewall of the bore. Where only the rail contacts the sidewall, seating or breaking-in of the seal is substantially retarded or even prohibited. An angled rail is subject to vibration, commonly known as ring flutter, when used in connection with a rapidly reciprocating piston. A thin steel member exposed to extreme heat, such as when utilized as the top compression ring in an internal combustion engine, will become distorted.

Seal assemblies of the above character where devised mainly during the time period ranging from approximately the middle nineteen thirties to early nineteen fifties. During the early nineteen seventies, there was developed a seal assembly, which substantially remedied the foregoing deficiencies inherent in the prior art. Distributed by POWER-FORMANCE INTERNATIONAL CORPORATION under the trademark TOTAL SEAL, the seal assembly has achieved commercial success, especially for use in connection with four-stroke cycle internal combustion engines.

Briefly, the TOTAL SEAL device, referred to as a ring set or ring assembly, includes a sealing ring member and a gap seal member. The sealing ring member, a severed annular member preferably fabricated of malleable metal such as cast iron, has thickness and radial dimensions to be received within a conventional piston ring groove in accordance with standard tolerances. Extending inwardly from the outer cylindrical surface along the underside of the sealing ring member is an annular recess in which is received the gap seal member. The intricacies and advantages of the ring are described in U.S. Pat. No. 3,811,690 and are well known to those having regard for the art.

Notwithstanding continuing success in the trade, the TOTAL SEAL ring set has proven less than optimum for engines having circumferential intake and/or exhaust ports such as found in two-stroke cycle engines. As installed, the respective end gaps of the sealing ring member and of the gap seal member are diametrically opposed. The elastic expansiveness or outward radial force of a severed annular seal under tension is gradiently distributed throughout. Therefore, while the set as an assembly is free to move or work within the ring groove, theoretically, movement between the members should be prohibited as the result of the relative forces therebetween.

Extensive use in testing has shown that occasionally relative movement will occur between the members. The ultimate relative movement is capable of aligning the respective end gaps. While the other advantages of the set remain, leakage can occur. Furthermore, the ends of the rings at the gap, when aligned with a port in a two-stroke cycle engine instead of the solid sidewall, can be sheared off in what is typically known as "clipping".

Considerable research and development has been directed toward devising a ring set, which will retain the numerous benefits of the present TOTAL SEAL ring set and yet provide additional benefits and resolve other problems of long-standing in the art. Substantial attention has been directed to an assembly in which the possibility of leakage is minimized. Thus, consideration has been given to extending the utility of the assembly for use in additional applications, including internal combustion engines having sleeve or port valves such as a two-stroke cycle engine and to making practical a piston having a single compression ring.

It would be highly advantageous, therefore, to remedy the foregoing and other deficiencies inherent in the prior art.

Accordingly, it is an object of the invention to provide improved ring set manufacturing methods.

Another object of the invention is the provision of improved methods of manufacturing ring sets especially adapted for use with internal combustion engines, positive displacement pumps, linear fluid actuated motors and other apparatus having a bore encircling a piston, shaft or other reciprocally movable component.

And another object of the invention is to provide improved methods of manufacturing ring sets that provides a ring sets having precise axial tolerance.

Still another object of the invention is the provision of an improved methods of manufacturing ring sets having highly polished upper and lower surfaces.

Yet another object of the invention is to provide improved methods of manufacturing ring sets having upper and lower surfaces with enhanced flatness and parallelism therebetween, and reduced surface irregularities.

And a further object of the invention is to provide improved methods of manufacturing ring sets that are reliable and cost-effective.

Still a further object of the invention is the provision of improved methods of manufacturing ring sets that are adapted and arranged to meet specific sealing applications.

And still a further object of the invention is the provision of improved methods of manufacturing ring sets that are adapted for use in mechanisms having an opening in the sidewall of the bore.

And yet still a further object of the invention is the provision of improved methods of manufacturing ring sets which are fast and adaptable for specific applications.

SUMMARY OF THE INVENTION

Finishing a seal assembly as a unit is proposed, which prevents alignment of the end gaps of the annular body and the annular ring of the seal assembly, provides the ability to manufacture a seal assembly to very low tolerances, and establishes virtually perfect parallelism between the upper and lower surfaces of a seal assembly. A finishing process is characterized by lapping a seal assembly as an assembled unit with a lapper using gritted oil as a polishing medium.

A preferred embodiment includes providing a seal assembly consisting of an annular body that is severed forming a first end gap and an annular ring that is severed forming a second end gap, in which the first and second end gaps are aligned. A lapper has a top plate and an opposing bottom plate furnished with a central rotated shaft and an outer perimeter edge. A carrier is disposed on the bottom plate, and meshingly interacts with the outer perimeter edge and the central shaft of the bottom plate. The carrier has a hole extending therethrough and has a spacer, which projects into the hole. The seal assembly is placed into the hole disposing the spacer at the first and second end gaps, preventing relative rotation between the annular body and the annular ring. The top plate moved into a working relationship with the bottom plate sandwiching the carrier and the seal assembly therebetween. Gritted oil is introduced to the top and bottom plates in which the top plate is rotated. Rotation of the top plate imparts rotation to the carrier and orbital movement of the carrier over the bottom plate about the rotated shaft, and the gritted oil functions as the polishing medium polishing the upper and lower surfaces of the seal assembly. The invention also proposes a seal assembly finished in accordance with the foregoing method, in which the seal assembly consists of an assembly of an annular body and an annular ring.

A seal assembly finished in accordance with the invention has 1)a radial tolerance of approximately 0.005 inch and an axial tolerance of approximately 0.0005 inch, 2)a radial tolerance of approximately 0.001 inch and an axial tolerance falling in a range of approximately 0.0001 inch to approximately 0.0004 inch, 3)a radial tolerance of approximately 0.001 inch and an axial tolerance of approximately 0.000050 inch. A seal assembly finished in accordance with the invention has 1)a ductile cast iron annular body and a cast iron annular ring, or 2)a ductile cast iron annular body and one of a cast iron annular ring and a steel annular ring. In a particular embodiment, the ring is fashioned with a positive torsional twist. The ring can also be fashioned with a standard barrel drop, or an increased barrel drop.

BRIEF DESCRIPTION OF THE DRAWINGS

Referring to the drawings.

DETAILED DESCRIPTION OF A PREFERRED EMBODIMENT

Figure 1:
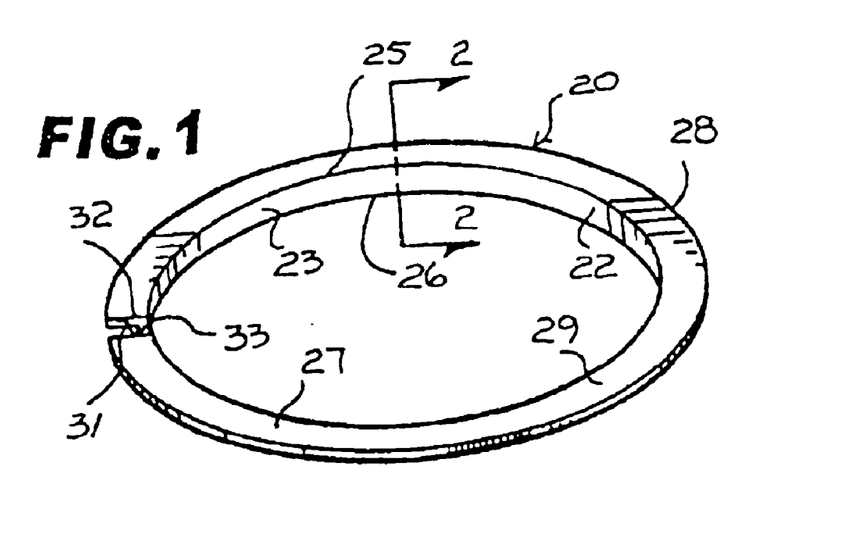
FIG. 1 is a perspective view of a seal assembly manufactured in accordance with the principle of the invention, the seal assembly for use in sealing together a pair of reciprocally movable members and including an annular body and an annular ring.
Figure 6:
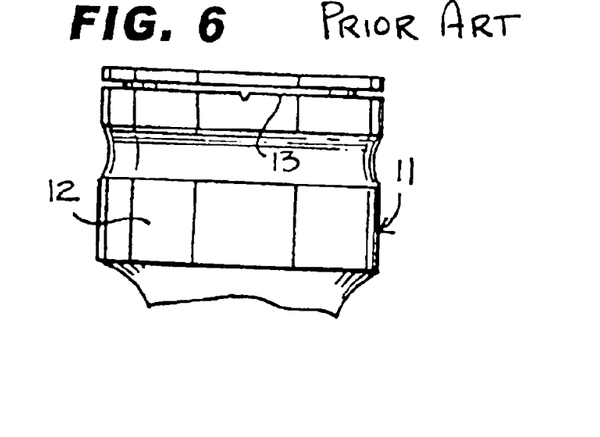
FIG. 6 is a side view of a piston.
Figure 8:
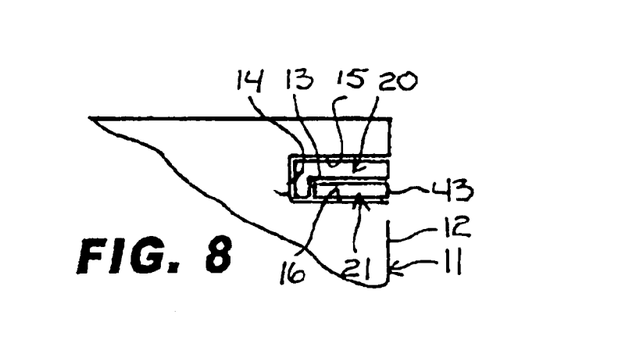
FIG. 8 is a side sectional view of the seal assembly of FIG. 1 shown as it would appear installed in the piston of FIG. 6.

A ring set manufacturing method and a ring set manufactured thereby will now be described with reference to FIGS. 1–11. Referring to FIG. 1, a seal assembly 10 for use in sealing together a pair of reciprocally movable members is illustrated, and which is manufactured in accordance with the principle of the invention. Although not shown, the reciprocally movable members are disposed for relative reciprocal movement along a linear axis. Such a mechanism is typically representative of internal combustion engines, positive displacement pumps, linear fluid actuated motors and similar apparatus including a first member or piston and a second member or cylinder having a cylindrical or continuous sidewall. Referring momentarily to FIG. 6, shown is a typical piston 11. In a conventional arrangement, the cylindrical sidewall is coaxial with and spaced from outer cylindrical sidewall 12 of piston 11. This space, commonly termed sidewall clearance, is necessary to ensure relative movement between the members. To retard leakage, piston 11 carries an annular groove 13, commonly known in the art as a ring groove. Annular groove 13 can accommodate a conventional piston ring or, regarding this invention, seal assembly 10. Seal assembly 10 minimizes fluid leakage between the reciprocally movable members. As shown in FIG. 8, annular groove 13 is open, generally rectangular in cross section, and is defined by the cooperation between a substantially axial surface 14 and opposed radial surfaces 15 and 16. Annular groove 13 opens outwardly. Seal assembly 10 is a ring assembly or a ring set.

Figure 3:
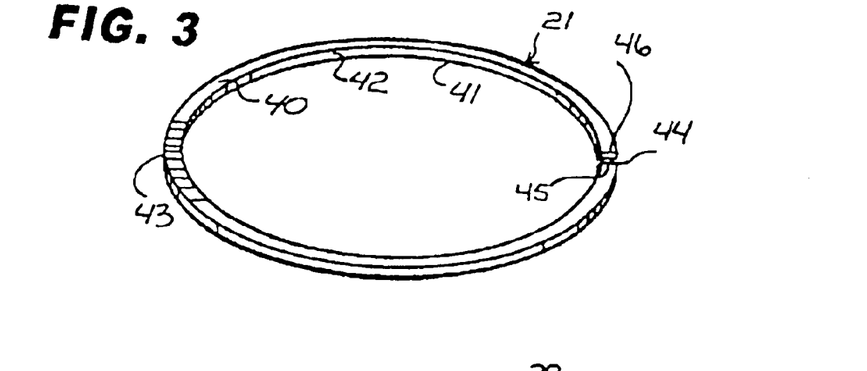
FIG. 3 is a perspective view of the annular ring of FIG. 2.
Figure 4:
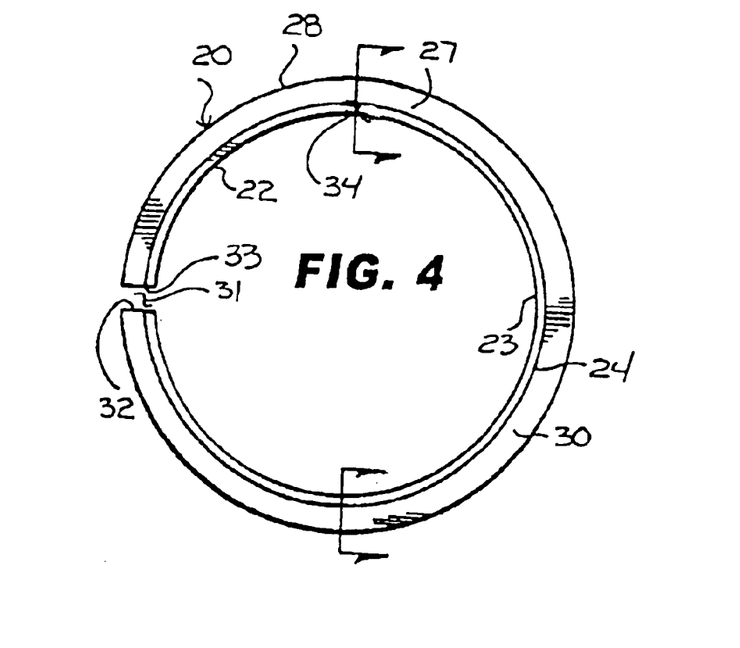
FIG. 4 is a bottom plan view of the annular body of FIG. 1.
Figure 5:
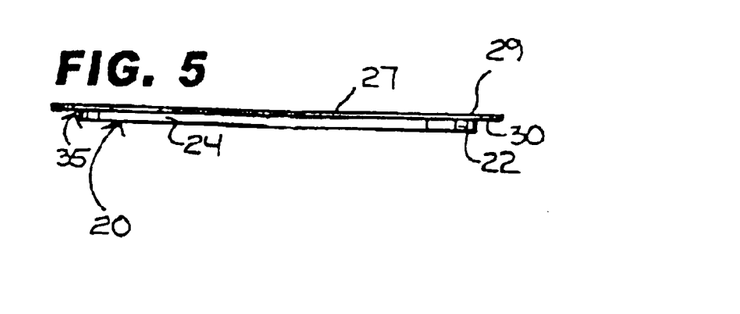
FIG. 5 is a side view of the annular body of FIG. 1.

Seal assembly 10 is dimensioned for receipt within conventional ring groove 13 in accordance with standard tolerances. Regarding FIGS. 1 and 3, seal assembly 10 consists of an annular top ring or body 20 and an annular rail or bottom ring 21, the general structure and function of which is set forth in U.S. Pat. No. 3,811,690, which is incorporated by reference herein. Annular body 20 is constructed of a selected malleable material such as cast iron or other similarly ductile material, and ring 21 is preferably constructed of steel. Particular materials of annular body 20 and ring 21 will be discussed in greater detail later in this specification in connection with exemplary ring set manufacturing methods, in accordance with the principle of the invention. Referring to FIG. 1, annular body 20 is L-shaped and includes an annular endwall 22, having inner and outer opposing axial surfaces 23 and 24 (outer axial surface 24 shown in FIG. 5, which illustrates a side view of annular body 20), a proximal end 25 and a free or distal end/surface 26. An annular flange 27 extends outwardly from proximal end 25 in opposition to axial surface 23 terminating with a free annular extremity or bearing surface 28. Flange 27 defines opposing radial surfaces 29 and 30 (radial surface 30 referenced in FIG. 5). With additional reference to FIG. 4 illustrating a bottom plan view of annular body 20, end gap 31 severs annular body 20 and defines spaced-apart free ends 32 and 33. Axial surface 24 of endwall 22 and radial surface 30 of flange 27 cooperate to form an annular recess or pocket 35, and this is illustrated FIG. 5. Referring to FIG. 3, ring 21 includes opposing radial surfaces 40 and 41, an inner axial surface 42 and an outer or bearing surface 43. Bearing surface 43 is often referred to as the "ring face." An end gap 44 severs ring 21 defining spaced-apart free ends 45 and 46. Recess 35 removably accommodates ring 21.

Figure 2:
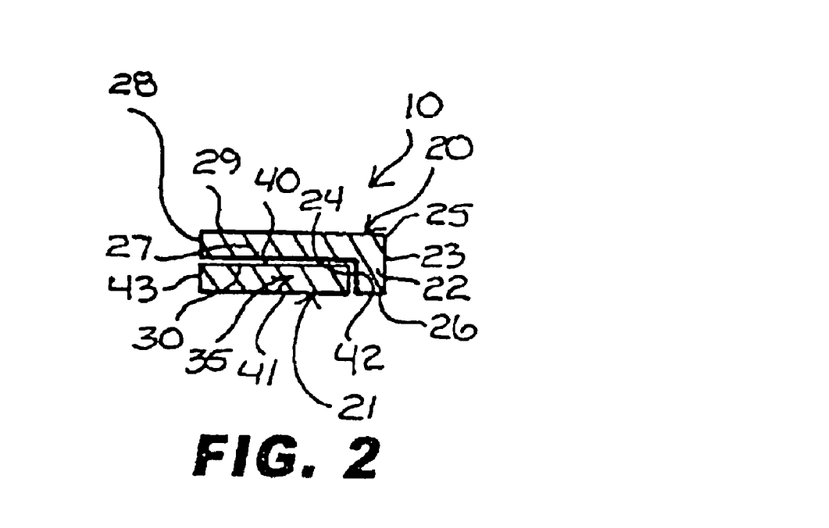
FIG. 2 is a sectional view taken along line 2—2 of FIG. 1.

FIG. 2 is a sectional view taken along line 2—2 of FIG. 1, and illustrates ring 21 properly positioned in recess 35. Axial surface 42 of ring 21 rests against or adjacent axial surface 24 of annular body 20, and radial surface 40 of ring 21 rests against or adjacent radial surface 30 of flange 27, and end gap 31 of annular body 20 is offset relative to end gap 44 of ring 21 in a range of, for instance, approximately five degrees to approximately ninety degrees. The degree of this end gap offset will depend on specific needs and, for instance, the spacing of the ports of the engine in which seal assembly 10 is to be used. Gaps 31,44 are offset so as to each be positioned adjacent a solid portion of bridge of the sidewall of the cylinder, and not the ports. The top or upper surface of seal assembly 10 is surface 29 of annular body 20, and the bottom or lower surface of seal assembly 10 is a combination of surfaces, namely, surface 26 of annular body 20 and surface 41 of annular ring 21.

The bearing or contact surface of this described embodiment consists of bearing surface 28 of annular body 20 and bearing surface 43 of ring 21. In use, bearing surfaces 28 and 43 are in sealing engagement with the cylindrical sidewall of the cylinder. Bearing surface 43 can be heat treated and/or coated with chrome or other protective anti-wear or anti-friction material for the purposes of wear and reduction of friction. Typically, a chrome plating may range between two one-thousandths and three one-thousandths of an inch.

Figure 7:
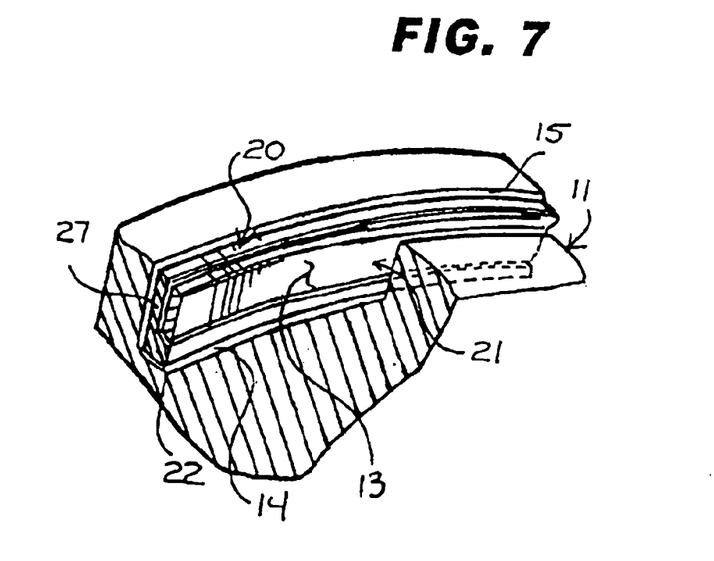
FIG. 7 is an enlarged fragmented perspective view of the seal assembly of FIG. 1 shown as it would appear installed in the piston of FIG. 6.

So assembled, seal assembly 10 is receivable by the annular groove 13 of piston 11 as shown substantially in FIGS. 7 and 8 in accordance with desired tolerances for providing a sealing engagement with the cylindrical sidewall of a cylinder. Properly installed, annular body 20 resides or otherwise rests in and against annular groove 13 so as to support and direct bearing surfaces 28 and 43 in sealing engagement against the cylindrical sidewall of an opposing cylinder. Annular body 20 holds ring 21 in place against radial surface 16 of annular groove 13. Annular body 20 and ring 21 are elastically expansive or biased so as to exert an outward force toward or against the cylindrical sidewall. The outwardly biased forces urge the bearing surfaces 28 and 43 toward and against the cylindrical sidewall in sealing engagement. In the desired orientation, each annular member serves to seal or close the end gap of the other member thereby eliminating the fluid leakage path inherent in conventional prior art piston rings. The outwardly biased forces to a certain extent prohibit relative movement between the annular body 20 and ring 21 of seal assembly 10 under forces of reciprocating movement. However, it has been noticed that relative rotation can occur which can result in fluid leakage.

Annular body 20 is sized to be removably received within annular groove 13. Properly installed, endwall 22 is directed toward or against axial surface 14, and an annular flange 27 extends away from endwall 22 adjacent or against radial surface 15. In accordance with conventional practice, the axial dimension of annular body 20 is approximately one one-thousandths to four one-thousandths of an inch narrower than groove 13. This clearance allows seal assembly 10 to move or work within groove 13, and further allows it to be installed and removed. Preferably, the cross-sectional dimensions of annular groove 13 are slightly larger than the cross-sectional dimensions of annular body 20. As a result, ring 21 may be installed within and removed from recess 35 and annular groove 13.

The elastic expansiveness or outwardly directed radial force of each of annular body 20 and ring 21 is significant. In a particular embodiment, annular body 20 exerts a total outward force of between three to twelve pounds, in which the degree of force depends on the needs of the user and the specific application. The outwardly directed force of ring 21 is, in comparison, generally negligible. In other words, ring 21 is substantially neutral and is in a relatively relaxed state when installed as compared to the bias provided by annular body 20. The fabrication of annular seals having prescribed elastic expansiveness will readily occur to the skilled artisan.

Seating of seal assembly 10, which is the mating with the cylindrical sidewall of the bore, is an important consideration in the art. As initially installed, bearing surfaces 28 and 43 comprise the contact surface that provides sealing engagement between piston 11 and a cylindrical sidewall. Due to the inherent characteristics of annular body 20 and ring 21 and, more particularly, bearing surfaces 28 and 43, bearing surfaces 28 and 43 are not easily worn away during initial and prolonged operation. Accordingly, seating of the seal assembly 10 is accomplished upon installation and no appreciable wear-in is required. The outwardly directed force of ring 21 facilitates the sealing engagement of bearing surfaces 28 and 43 to the cylindrical sidewall, the force against the cylindrical sidewall being borne by piston 11.

Over the operating life of the apparatus considered from initial operation to normal time for replacement or rebuild, the diameter of the cylindrical sidewall of the cylinder will enlarge and the diameter of the seal assembly 10 will decrease. However, no loss in the effectiveness of seal assembly 10 or leakage will occur. As the cylindrical sidewall and the annular body 20 and rail 21 material wear away, annular body 20 will continue to expand to maintain the desired seal of outer bearing surfaces 28 and 43 to the cylindrical sidewall without coming in contact with the cylindrical sidewall. Concurrent with the expansion of annular body 20 and ring 21, end gaps 31 and 44 will increase. Ring 21, however, will continue to function as an end gap seal member. It is noted that because only a small portion of annular body 20 and ring 21 are exposed to heat from the gases of combustion, no warping or distortion will occur. Over an extended period of operation, bearing surfaces 28 and 43 will wear down to such a degree that replacement becomes necessary. At this point in operation, seal assembly 10 may be removed from annular groove 13 and replaced with a new one to resume operation.

In a particular embodiment, the bearing or contact surface of seal assembly 10 consists only of the ring face of ring, namely, bearing surface 4. In this embodiment, seal assembly 10 is constructed and arranged providing bearing surface 43 of ring 21 projecting somewhat outboard of bearing surface 28 of annular body 20.

It is to be understood that seal assembly 10 is manufactured in accordance with conventional practice, but only to the extent of its described structure and not to finishing processes in accordance with the principle of the invention and which will now be discussed. The invention is, therefore, concerned with finishing processes for seal assemblies, such as seal assembly 10, which finishing processes are considered part of the seal assembly manufacturing process.

Figure 9:
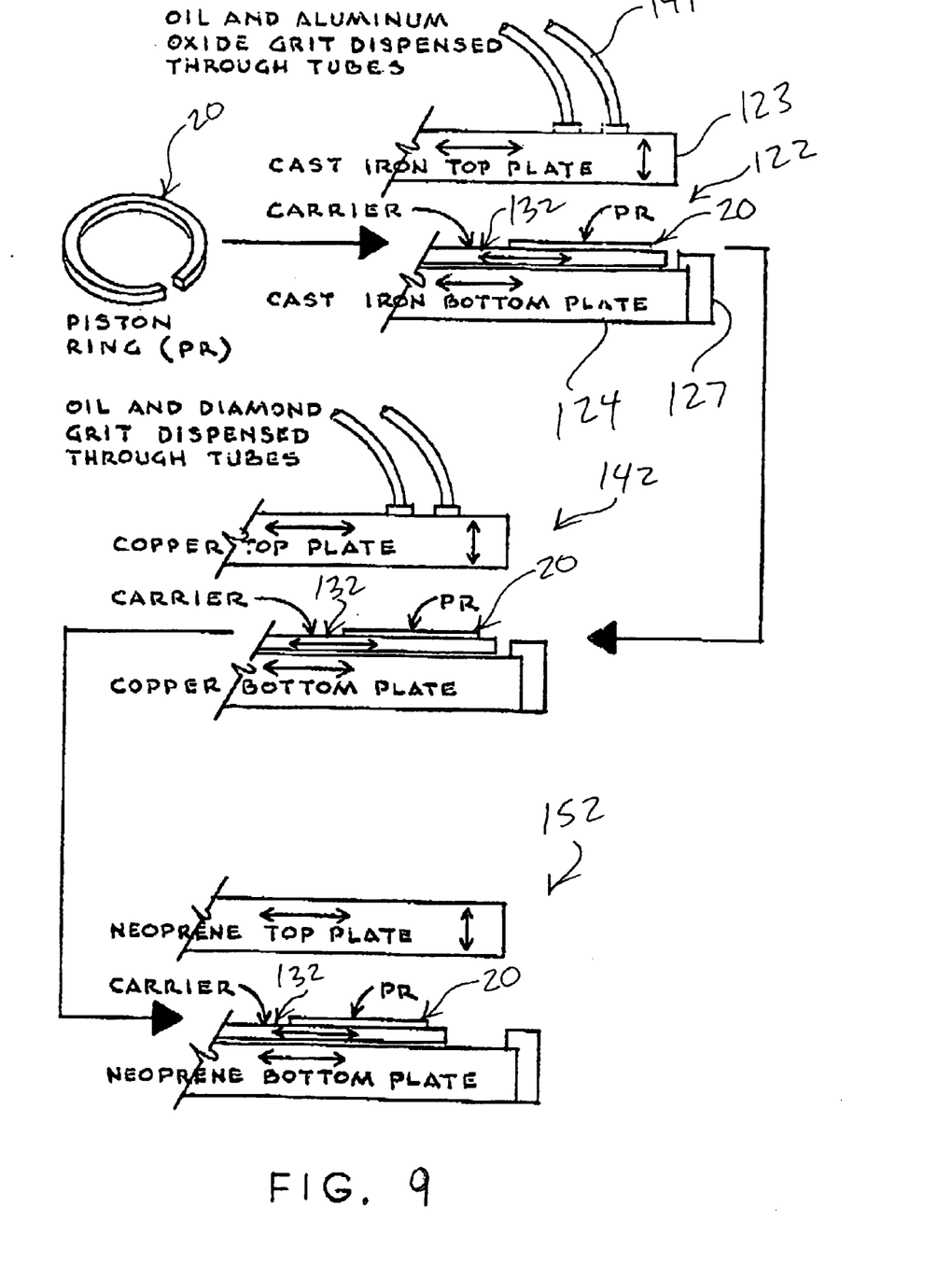
FIG. 9 is a schematic representation of a method of manufacturing the seal assembly of FIG. 1.

In accordance with the principle of the invention, ensuing methods teach how to manufacture seal assemblies of very low tolerances, such as seal assembly 10, which is manufactured in accordance with the principle of the invention. Turning to FIG. 9, seal assembly 10 is depicted generally, and is taken assembled with gaps 31,44 aligned to a lapping machine 122. Conventionally, lapping machine 122 has cast iron top and bottom plates 123,124, which have grooves 125 (FIG. 10) cut into the facing surfaces thereof. Grooves 125 form a crosshatch pattern. Top and bottom plates 123,124 can be rotated, and top plate 123 can also be lowered or raised. Top and bottom plates 123,124 can be rotated in opposite directions.

The invention provides carriers 132, which are mounted to lapper 122 and ride on bottom plate 124 as shown in FIG. 2. Seal assemblies, each structurally identical to assembly 10, are provided with their respective end gaps 31,44 aligned, and are placed in carriers 132 residing on the bottom plate 124 as shown in FIG. 2. As a matter of illustration only, FIG. 9 illustrates one seal assembly, with the understanding the many seal assemblies can be manufactured at the same time. Carriers 132 are shown in FIG. 2 and are structurally identical with only one being shown in detail in FIG. 3. Each carrier 132 is circular in shape and has teeth 133 on its outer periphery. Carrier 132 has annular holes/openings 134, extending therethrough, into which the seal assemblies are laid. Preferably, each carrier 132 has seven holes and thus accommodates seven corresponding seal assemblies, and less are more can be employed. In the embodiment of FIG. 2, lapper 122 is furnished with five carriers 132, and less or more can be used. Each hole 134 is approximately the size of the associated seal assembly and has a protuberance/spacer 135, which fits into gaps 31,44 of annular body 20 and ring 21, respectively, preventing relative rotation between annular body 20 and ring 21 during the lapping process. It is to be understood that end gaps of the seal assemblies are aligned with one another in this manufacturing process and that the seal assemblies are finished as assembled units, in accordance with the principle of the invention. Carrier 132 teeth 133 mesh with teeth 128 on an inwardly facing outer perimeter edge of an outer rim/perimeter 127 of lower plate 124 forming a ring gear. Carrier 132 teeth 33 also mesh with teeth 130 on an outer surface of a central inner shaft 129 rotated to lower plate 124, forming a sun gear. The foregoing discussion of one of carriers 132 applies to all carriers 132.

Figure 10:
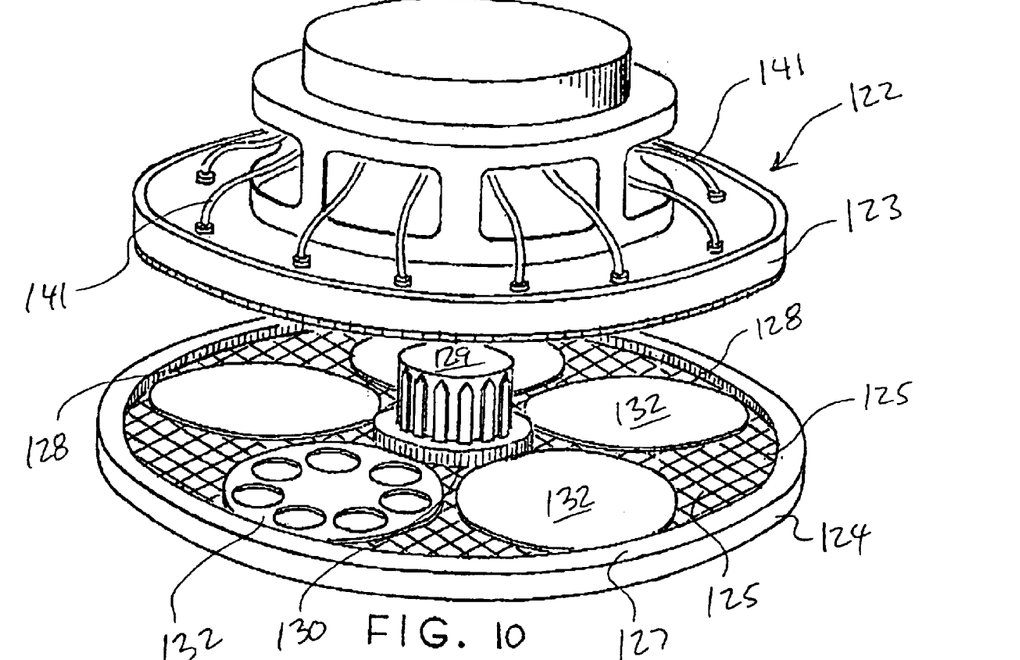
FIG. 10 is a perspective view of a lapper incorporating ring carriers, the lapper for use in the method illustrated in FIG. 9.
Figure 11:
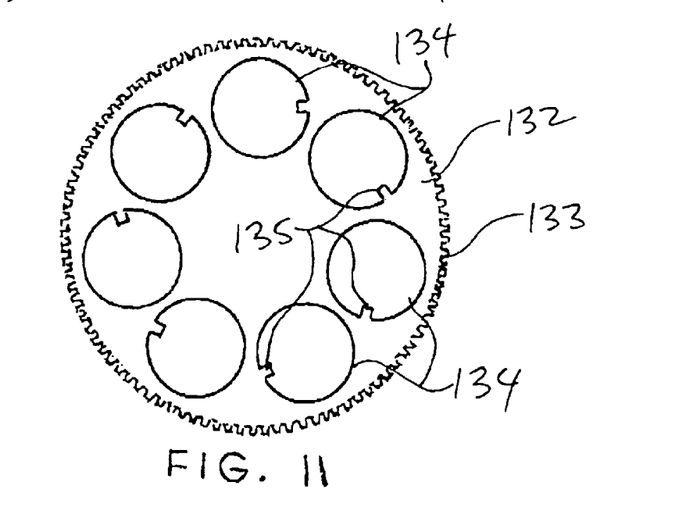
FIG. 11 is a top plan view of one of the ring carriers of FIG. 10, the bottom plan view being a substantial mirror image thereof.

Tubes 41, shown in FIG. 10, conduct oil from a source to plates 123,124 through holes (not shown) in top plate 123.

The oil is loaded with grit having a selected grit size, which performs a machining function. In lapping machine 22, aluminum oxide grit is added to the oil. The grit size is approximately 4–6 microns. The oil is pumped through top plate 123. Other grit material can be used other than or in addition to aluminum oxide grit, such as diamond grit material, etc.

In a lapping process, top 123 plate is disposed against bottom plate 124 and against the seal assemblies disposed in carriers 132, in which shaft 29 projects into a mating seat (not shown) formed into top plate 123. When lowered, top plate 123 provides pressure against the seal assemblies positioned in carriers 132 between top and bottom plates 123,124. Oil is directed into lapper 122 through tubes 41 and top plate 123 is rotated, and also bottom plate 124 in the opposition direction if desired, which rotates shaft 129 causing carriers 132 to rotate and orbit around shaft 129. The grit carried by the applied oil is the polishing medium, which polishes the upper and lower surfaces of the seal assemblies as carriers 132 rotate, and as they orbit about shaft 129, working against top and bottom plates 123,124.

The spacers 135 of the carriers 135 prevents the gaps 31,44 of the seal assemblies installed therewith from closing, which functions to prevent the seal assemblies from buckling during the lapping process. The way in which the carriers rotate and orbit keeps the gritted oil distributed evenly during the lapping process, and the tolerances in seal assemblies capable of being achieved in the lapping process herein described can only be achieved with the use of carriers 135.

Plates 123,124 are measured by the use of level measuring devices of high sensitivity so that their flatness can be maintained within specified tolerances. If plates 123,124 become too hot or too cold, they can loose their flatness, which makes the lapper go out of tolerance for its machining process. Plates 123,124 can be heated by placing carrier like members on plates 123,124 and running the machine with gritless oil until the plate surfaces are heated to an acceptable temperature. Plates 123,142 can be cooled if needed, by providing fans which blow air over the plate surfaces.

Once the lapping process is finished on lapper 122, the seal assemblies are removed and wiped clean, measured, and either lapped again with lapper 122 if their measurements fall outside of desired tolerances, or taken to a copper plate lapper 142 if their tolerances fall within desired tolerances. Lapper 142 is structurally identical to lapper 122 and incorporates carriers 132 and operates similarly to lapper 122, but is able to bring the axial tolerances between the top and bottom surfaces of the seal assemblies to the desired tolerance level of plus or minus one one-thousandths of an inch. After the lapping process is finished on copper plate lapper 142, the seal assemblies are cleaned, measured and either lapped again with lapper 142 if their measurements fall outside of desired tolerances, or taken to lapper 152 if their tolerances fall within desired tolerances. Lapper 152 is structurally identical to lapper 122 and incorporates carriers 132 and operates similarly to lapper 122. The seal assemblies are polished on lapper 152, which has neoprene plates using oil and grit, preferably diamond grit, as previously described. This last step takes very little off the top and bottom surfaces.

Seal assemblies, such as seal assembly 10, finished with the lapping process herein disclosed produces seal assemblies having precise and easily controlled axial tolerances. Also, upper and lower surface finishes of approximately 4 rms (a root-mean-square average height of 4 millionths of an inch) can be achieved, as compared to approximately 20 rms (a root-mean-square average height of 20 millionths of an inch) with conventional piston ring surface finishing processes. Seal assemblies, such as seal assembly 10, finished with the lapping process herein disclosed also produces seal assemblies with upper and lower surface finishes each having virtually immeasurable waviness.

Finishing seal assemblies as assemblies in the finishing process herein disclosed is of great value resulting in surprising results, namely, upper and lower surface finishes having immeasurable waviness and attainable roughness of approximately 4 rms and seal assemblies having very low axial tolerances. As a result, the upper and lower surfaces of the finished seal assembly are highly polished, and a high degree of parallelism is achieved between the upper and lower surfaces, and these aspects are achieved by finishing such seal assembly 10 as a unit rather than annular body 20 and ring 21 separately. And so the main advantages of the manufacturing process herein described is that it increases seal assembly flatness of its upper and lower surfaces, and increases the parallelism between the upper and lower surfaces thereof. In fact, it has been noticed the heightened degree of parallelism between the upper and lower surfaces of a seal assembly cannot be achieved if annular body 20 and ring 21 are finished separately. Only by finishing seal assembly 10 as a unit as herein described can highly polished upper and lower surfaces be achieved in the assembly along with a heightened degree and, moreover, a virtually perfect degree of parallelism therebetween the upper and lower surfaces in the assembly. As a result of this, the tolerance of a seal assembly 10 finished in accordance with the finishing process herein described is capable of being brought down consistently to one one-thousandths of an inch. It is also observed that a seal assembly finished as an assembly in accordance with the invention results in a seal assembly having very little indication of where the ring begins and where the annular body begins. In a particular embodiment, the axial thickness of a seal assembly finished with the finishing process herein described is 0.0621 inch to 0.0623 inch.

Installing a seal assembly manufactured in accordance with the invention within an annular groove of a piston for providing a seal against a corresponding sidewall is exactly like that discussed previously in connection with seal assembly 10, in which an exemplary seal is provided between the seal assembly and the cylinder sidewall as previously explained. It has been noticed that the precise tolerances capable of being achieved with a seal assembly constructed in accordance with the invention, namely, the low roughness (e.g., high degree of flatness) and the virtually immeasurable waviness of the upper and lower surfaces of the seal assembly and the consistent ability to manufacture a seal assembly with an axial tolerance of approximately one one-thousandths of an inch and the virtually perfect parallelism between the upper and lower surfaces of the seal assembly, eliminates migration of gases and oil through the annular groove of a piston around the seal assembly disposed therein. A seal assembly manufactured in accordance with the invention provides an improved tolerance/connection/interaction between the seal assembly and the annular groove of the piston eliminating blow-by through the annular groove of the piston around the seal assembly eliminating migration between the annular body and the ring preventing alignment of the corresponding end gaps. A piston assembly incorporating a seal assembly manufactured in accordance with the invention increases the efficiency of the piston assembly increasing the efficiency of the down/intake and power/compression strokes of the piston by providing an increased draw of fuel into the cylinder on the intake stroke and a corresponding increase in fuel burn on the compression stroke, which results in increased horsepower output and increased crank cylinder compression, actually bringing the piston assembly close to its actual mechanical rated compression. Stored gas in and around the seal assembly at the annular groove of the piston is also eliminated and it has been noticed that the intake and compression strokes start earlier as compared to a seal assembly manufactured in accordance with conventional practice. Accordingly, a piston assembly incorporating a seal assembly manufactured in accordance with the invention greatly increases the efficiency of the piston assembly providing increased horsepower, increased torque and decreased blow-by, which also provides reduced emissions. It is to be understood that although three lapping events are disclosed with three different lappers in connection with a preferred embodiment disclosed herein, the invention can be facilitated with one lapper in one or multiple lapping procedures, in which the objects and advantages of the invention are achieved by lapping seal assemblies, namely, assemblies of annular bodies and corresponding annular rings, with carriers 135.

In providing customers with seal assemblies fashioned in accordance with the principle of the invention, many customer input parameters must be considered, namely, engine type and engine performance characteristics, compression ratios, fuel type, compression distance, oil system type, and required longevity. Many of these parameters are dependent on the type of vehicle environment in which the seal assemblies are to be used, such whether the seal assemblies are to be used with a street vehicle, a high performance muscle car, a sportsman drag racer, a professional racing vehicle such as a professional drag racer or Winston Cup vehicle, an exotic racing vehicles such as F1 and IRL race vehicles, etc. The foregoing vehicle types have different operating characteristics and require different types of seal assemblies.

In choosing the right seal assembly for a particular application, it is important to consider the different materials and characteristics that a seal assembly can have. Variables for a seal assembly include ring materials, ring coatings, ring finishes, axial seal assembly-to-ring groove tolerances, ring torsional twist characteristics, and ring barrel drop or ring face profile. Ring materials include cast iron having a hardness of 90 on the Brinell hardness scale (hereinafter B-scale), ductile iron having a hardness of 104 on the B-scale, heat-treated ductile iron having a hardness of 108 on the B-scale, centrictically cut ductile iron having a hardness of 108 on the B-scale, stainless steel having a hardness of 36–40 on the Rockwell C-scale (hereinafter C-scale), and H11/H13 tool steels having a hardness of 46 on the C-scale. Coatings for the upper and lower surfaces of a seal assembly can include black oxide, phosphate, and tungsten disulfide. Ring face coatings can include raw metal material, molybdenum, chrome (including very thin applied flash chrome layers and thicker plate chrome layers of approximately 5–10 micro-inches), chromium nitride, tungsten carbide, tungsten carbide carbon, titanium nitride, tungsten cobalt carbon, electrolysis nickel, HVOF-applied molybdenum, plasma molybdenum, and plasma nitride coatings. Finishes for the upper and lower surfaces of the seal assembly can have a roughness of less than 4 rms, 10–16 rms, and 20–40 rms, as a matter of examples. Axial seal assembly-to-groove tolerances can range from less than one one-thousandths of an inch to approximately four one-thousandths of an inch. Ring torsional twist characteristics can be positive (directed upwardly) or negative (directed downwardly). Most ring faces have a standard barrel-faced configuration, although straight ring face profiles are often used. In a barrel face configuration, the contact point of the ring face to the sidewall of the cylinder can be disposed off-center and the barrel drop can be varied for increasing and decreasing the degree of contact surface between the ring face and the sidewall of the cylinder. It is to be understood that the greater the barrel drop the lesser the contact surface of the ring face to the sidewall of the cylinder and the greater the unit pressure of the ring face against the sidewall of the cylinder. And so as the barrel drop increases, the tangential drag on the ring face decreases. In this regard, the radial tension on the ring face can be controlled by varying the ring face profile, namely, the degree of barrel drop.

Given the seal assembly variables and the customer input variables, it has been found that the following seal assembly configurations are recommended for the following vehicle types, namely, street vehicles, high performance muscle cars, sportsman drag racers, professional racing vehicles such as professional drag racers or Winston Cup vehicles, and exotic racing vehicles such as F1 and IRL race vehicles. For a street vehicle, a recommended seal assembly configuration includes 1)ring material: cast iron ring and ductile cast iron for the annular body, 2)ring coating: plasma molybdenum, 3)ring finish: 20–30 rms, 4)tolerances: radial tolerance of +/−0.005 inch and axial tolerance of +/−0.0005 inch, 5)positive torsional twist, and 6)standard barrel drop ring face profile.

For a high performance muscle car, a recommended seal assembly configuration includes 1)ring material: cast iron or steel for the ring and ductile cast iron for the annular body, 2)ring coating: PVD (particle vapor deposition) applied tungsten carbide, 3)ring finish: 12–18 rms, 4)tolerances: radial tolerance of +/−0.001 inch and axial tolerance of +/−0.0001–0.0004 inch, 5)positive torsional twist, and 6)standard barrel drop ring face profile.

For a sportsman drag racing vehicle, a recommended seal assembly configuration includes 1)ring material: cast iron or steel for the ring and ductile cast iron for the annular body, 2)ring coating: PVD applied tungsten carbide or chromium nitride, 3)ring finish: 12–18 rms, 4)tolerances: radial tolerance of +/−0.001 inch and axial tolerance of +/−0.0001–0.0004 inch, 5)positive torsional twist, and 6)standard barrel drop ring face profile to increased barrel drop ring face profile.

For a professional racing vehicle, a recommended seal assembly configuration includes 1)ring material: cast iron or steel for the ring and ductile cast iron for the annular body, 2)ring coating: PVD applied tungsten carbide or chromium nitride, 3)ring finish: 2–4 rms, 4)tolerances: radial tolerance of +/−0.001 inch and axial tolerance of +/−0.000050 inch, 5)positive torsional twist, and 6)increased barrel drop ring face profile.

For an exotic racing vehicle such as F1 and IRL racing vehicles, a recommended seal assembly configuration includes 1)ring material: steel for the ring and ductile cast iron for the annular body, 2)ring coating: PVD applied tungsten carbide, 3)ring finish: 2–4 rms, 4)tolerances: radial tolerance of +/−0.001 inch and axial tolerance of +/−0.000050 inch, 5)positive torsional twist, and 6)increased barrel drop ring face profile.

The present invention is described above with reference to a preferred embodiment. However, those skilled in the art will recognize that changes and modifications may be made in the described embodiment without departing from the nature and scope of the present invention. For instance, the lapping process described herein can be used with conventional piston rings, if desired. Also, a particular permutation of the invention proposes a seal assembly including an annular body or top ring and an annular ring or bottom ring, much like seal assembly 10. In considering the annular ring, it is cut to bore size and then severed with a 0.008 inch wire, which forms the end gap. By providing an annular ring for use in a seal assembly as herein described and then cutting the annular ring with a 0.008 inch wire or blade forming the end gap, the concentricity of the annular ring is maintained, preventing the need to cut the ring to over-bore size and then severing the ring to form an end gap that is large enough so that the annular ring can be brought down to bore size, which forms an annular ring that is not concentric. Maintaining concentricity in an annular ring by cutting it to bore size and then severing it with a 0.008 inch wire or blade functions to provide exemplary seating of the annular ring upon installation of a seal assembly in which it is used.

Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method comprising steps of:
   providing a seal assembly comprising an assembly of an annular body and an annular ring;
   finishing the seal assembly to desired tolerances by lapping the seal assembly, wherein the step of lapping the seal assembly comprises:
      providing a lapper having a top plate and an opposing bottom plate having a central rotated shaft and an outer perimeter edge;
      providing a carrier disposed on the bottom plate meshingly interacting with the outer perimeter edge and the central shaft of the bottom plate;
      disposing the seal assembly into the carrier;
      bringing the top plate into a working relationship with the bottom plate sandwiching the carrier and the seal assembly therebetween;
      introducing gritted oil to the top and bottom plates; and
      rotating the top plate, in which rotation of the top plate imparts rotation to the carrier and orbital movement of the carrier over the bottom plate about the rotated shaft.

2. A method comprising steps of:
   providing a seal assembly comprising an annular body that is severed forming a first end gap and an annular ring that is severed forming a second end gap, in which the first and second end gaps are aligned;
   providing a lapper having a top plate and an opposing bottom plate having a central rotated shaft and an outer perimeter edge;
   providing a carrier disposed on the bottom plate meshingly interacting with the outer perimeter edge and the central shaft of the bottom plate, the carrier having a hole extending therethrough and a spacer projecting into the hole;
   placing the seal assembly into the hole disposing the spacer at the first and second end gaps;
   bringing the top plate into a working relationship with the bottom plate sandwiching the carrier and the seal assembly therebetween;
   introducing gritted oil to the top and bottom plates; and
   rotating the top plate, in which rotation of the top plate imparts rotation to the carrier and orbital movement of the carrier over the bottom plate about the rotated shaft.

* * * * *